United States Patent [19]

Andrejco et al.

[11] 4,257,797

[45] Mar. 24, 1981

[54] OPTICAL FIBER FABRICATION PROCESS

[75] Inventors: Matthew J. Andrejco, Wrightstown; John B. MacChesney, Lebanon, both of N.J.

[73] Assignees: Western Electric, New York, N.Y.; Bell Telephone Laboratories, Incorporated, Murray Hill, N.J.

[21] Appl. No.: 80,482

[22] Filed: Oct. 1, 1979

Related U.S. Application Data

[63] Continuation of Ser. No. 1,379, Jan. 5, 1979, abandoned.

[51] Int. Cl.³ .................... C03C 25/02; C03B 37/02
[52] U.S. Cl. .......................................... 65/3 A; 65/2; 65/13; 65/18; 65/60 D
[58] Field of Search .................. 65/3 A, 18, 13, 60 D, 65/2; 427/237

[56] References Cited

U.S. PATENT DOCUMENTS

| | | | |
|---|---|---|---|
| 3,775,075 | 11/1973 | Keck et al. | 65/3 A |
| 3,778,132 | 12/1973 | Pinnow et al. | 65/3 A X |
| 3,826,560 | 7/1974 | Schultz | 65/18 X |
| 4,045,198 | 8/1977 | Rau | 65/60 X |
| 4,145,456 | 3/1979 | Küppers et al. | 65/3 A |

FOREIGN PATENT DOCUMENTS 1500530 6/1978 United Kingdom .

*Primary Examiner*—Robert L. Lindsay, Jr.
*Attorney, Agent, or Firm*—Samuel H. Dworetsky; Peter V. D. Wilde

[57] ABSTRACT

A method of practicing the MCVD process is disclosed. In the inventive process, the core deposition is completed prior to completion of the cladding. An intermediate preform structure with a core-to-clad ratio greater than that desired in the ultimate fiber is consequently obtained. Subsequent to internal core deposition, additional material is added externally to complete the cladding thereby yielding an optical fiber preform with the desired core-to-clad ratio.

10 Claims, No Drawings

OPTICAL FIBER FABRICATION PROCESS

This is a continuation of application Ser. No. 001,379, filed Jan. 5, 1979 now abandoned.

BACKGROUND OF THE INVENTION

1. Field of the Invention

This invention involves the fabrication of optical fibers.

2. Description of the Prior Art

During the past decade, optical fiber fabrication technology has advanced to the point where fibers with losses on the order of one db per kilometer may be fabricated as a matter of course. Low loss fibers (less than 10 db/km at 825 nm.) have made optical communications an economically viable reality.

Two major optical fiber structures are most prevalent. The first involves what is commonly referred to as a single mode fiber. This fiber has a relatively small diameter core region, and a relatively large diameter cladding region of lower index of refraction. The dimensional and physical characteristics of the core region results in the transmission of radiation in only one electromagnetic configuration, or mode. In this single mode configuration, large amounts of energy are transmitted in the cladding and hence its purity is of significant concern.

The second major optical fiber structure is commonly referred to as the multi-mode configuration. In this configuration, the core region is of a size on the same order of magnitude as the cladding. Such a fiber can support numerous optical modes. Since the velocity of the light within the fiber varies from mode to mode, a single pulse transmitted in such a fiber suffers significant temporal distortion, referred to as mode dispersion. Such mode dispersion is minimized by, for example, fabricating the fiber with a radial gradation in the index of refraction—the larger values of index of refraction appearing near the center of the core. In this graded configuration, only a minimal amount of electromagnetic energy is transmitted in the cladding. Nevertheless, the purity of the cladding is of concern, especially for very low loss fibers.

There are two basic processing techniques which have been developed and refined to the point where they can regularly produce low loss fibers. Each of them involves the fabrication of a relatively large structure—an optical fiber preform—from which the optical fiber is drawn. The index of refraction characteristics of the preform are identical to those of the ultimate fiber.

The first fabrication process is commonly referred to as the "soot" process and is described in U.S. Pat. Ser. Nos. 3,775,075 and 3,826,560 assigned to the Corning Glass Works and hereby incorporated by reference into this application. In this process, translucent glass precursor particulates are deposited on a rod-like mandril by a deposition device which traverses the rod longitudinally numerous times. Before each pass, the dopant concentration in the precursor vapor may be changed so that a structure with an appropriate refractive index gradation will be ultimately formed. Susequent to deposition, the rod may be removed, and the glass precursor structure is "consolidated" by heating in an appropriate environment to yield a transparent glass optical fiber preform from which the optical fiber is drawn. In this technique, the glass precursor particulate deposition device is most often a hydrolysis burner.

An advantage of this "soot" technique is its relatively rapid fabrication rate or throughput. A disadvantage stems from the chemistry inherent in the exemplary hydrolysis deposition device. Water vapor which is produced during the hydrolysis is incorporated into the fiber and becomes a source of significant insertion loss. Special procedures may be followed to minimize this effect, but it remains a source of serious concern.

The second prevalent fiber fabrication process is referred to as the modified chemical vapor deposition process (MCVD), described in U.S. patent application Ser. No. 828,617 and hereby incorporated by reference into this application. In this process, appropriate glass precursor reactants are flowed through a tubular starting member. The tube is heated by an external heat source which periodically traverses the tube. When the reactants pass the hot zone generated by the traversing heat source, they react, primarily homogeneously—i.e., in the center of the tube away from the wall—to yield translucent glass precursor particulates. These particulates then deposit downstream of the heat source under the thermophoretic influence of a favorable temperature gradient and are consolidated into a transparent glass by the passing hot zone. In this manner, numerous layers may be deposited and appropriate index of refraction configurations formed. The starting member may be used either as an optically active cladding (i.e., participating in the transmission process) or as an inactive jacket. In the latter case, the cladding may be deposited on the interior of the tube prior to deposition of the core. Barrier layers to prevent migration of impurities from the tubular starting member to the deposited material may also be deposited. However, in the prior art practice of MCVD, the cladding was completed prior to deposition of the core. Subsequent to deposition, but prior to, or simultaneously with, drawing the structure may be collapsed to a solid optical fiber preform.

A primary advantage of the modified chemical vapor deposition process lies in the fact that the glass precursor particulates are formed in a reaction zone which is devoid of hydrogen bearing compounds and protected from externaly born contaminants. Consequently, an ultra-pure material results with little trace of deleterious water or other contamination.

SUMMARY OF THE INVENTION

This invention is a new method of practicing the MCVD process. In this new process, the core deposition is completed prior to completion of the total cladding. The technique involves depositing appropriate glass material on the interior of a tubular starting member using the MCVD process. This deposition includes the complete deposition of the core. Subsequent to this internal deposition, additional material is added externally by any appropriate technique to complete the cladding. The intermediate structure, prior to completion of the cladding, has a core-to-clad ratio greater than that desired in the ultimate fiber.

DETAILED DESCRIPTION

This invention departs from the prior art MCVD process in that the core deposition is completed prior to completion of the cladding. In the prior art MCVD process, the cladding was always completed prior to completion of the core. Since, in this invention, the cladding is incomplete when the core is deposited, there is less of a thermal barrier during core deposition. Subsequent to core deposition, and prior to completion of the cladding, and intermediate structure is obtained with a core-to-clad ratio greater than that desired in the ultimate fiber. Subsequent addition of cladding material yields the desired core-to-clad ratio and completes the preform.

Since this invention permits core deposition prior to completion of the cladding, the thermal barrier normally presented by the complete cladding during core deposition is significantly reduced. This permits the practice of the MCVD process using large diameter starting tubes. In the typical prior art practice of the MCVD process, the cladding was completed prior to core deposition. Consequently, if large diameter tubes were used upon which large amounts of core material were to be deposited, thick walls were required to obtain the proper core-to-clad ratio in the ultimate fiber. Such thick walls, however, hindered adquate thermal transfer to the interior of the tube wall and to the reactants, and hence prevented effective reaction, deposition and consolidation, as well as adequate collapse subsequent to deposition. If the prior art practitioner would have considered utilizing large diameter thin-walled tubes (as opposed to thick-walled tubes), he would have deposited cladding on the interior of such tubes prior to deposition of the core in order to obtain the proper core-to-clad ratio. However, once again, he would find himself with a thick walled tube with the concomitant thermal transfer problem. The prior art, consequently, never envisioned the utilization of large diameter thin walled tubes for internal MCVD deposition of large amounts of core material to yield a structure with a core-to-clad ratio larger than that desired in the ultimate fiber, since in the prior art practice of MCVD, the cladding had to be completed prior to completion of the core. This invention, however, permits the use of thin-walled tubing upon which large amounts of core material may be deposited, prior to completion of the cladding, yielding an intermediate structure with an unusually large core-to-clad ratio. Additional material is then deposited externally so as to bring the core-to-clad ratio to the desired value.

The invention permits one to obtain high purity cores with overall fabrication rates higher than that normally obtained with MCVD. The deposited material may be limited to core material or may include cladding layers as well as barrier layers. The external deposition may include the formation of an optically active cladding as well as an optically inactive jacket. Both such layers may be included in the term "cladding" as it is used here.

The invention will be most often practiced with relatively large diameter starting tubes. An appreciation of the advantages to be gained from the use of these tubes requires an extended discussion of the dynamics of the MCVD process. In the prior art practice of MCVD, the starting tube is usually used as the cladding, or the cladding is deposited internally prior to deposition of the core. Since the cladding in single mode fibers, and to a lesser extent in multi-mode fibers, is optically active, high purity materials are required. Heretofore, relatively small diameter tubes, e.g., less than 20 or 25 mm, with relatively thick walls, e.g., greater than 1 or 1.5 mm, were used. The amount of core material deposited was determined based on a consideration of the wall thickness. Such a consideration is required when the wall is to form the ultimate cladding and a specific core-to-clad ratio is desired.

One direction to follow if increased fabrication rates are required is to use large-diameter thick wall tubes to make preforms from which greater amounts of fiber can be drawn. Such thick wall large diameter tubes would require the deposition of greater amounts of core material in order to obtain the desired core to clad ratio. When, however, this direction was pursued, it was found that the MCVD reaction could not be easily carried out. Detailed investigations indicated that the reason for this difficulty involved the thermal transfer properties of the thick walled tube.

It is clear that the reactant heating, and consequently the reaction chemistry, in the MCVD process is very much dependent on the effective heating of the gases which pass through the starting tubular member. In the standard MCVD process, the time that it takes for the interior of the tube to reach the temperature of the heat source, e.g., the flame, is determined by the thermal diffusivity, k, of the tube walls. Specifically, it takes a time $t_k = d^2/k$—where d is the wall thickness—for heat to penetrate the wall. For silica, the thermal diffusivity, k, lies between 0.04 and 0.08 mm$^2$ per second. Therefore, for a 2 mm tube wall thickness, the length of time which it takes to obtain a uniform temperature throughout the silica walls is between 50 and 100 seconds. It is clear that the temperature on the inside of the tube walls need not necessarily approach the approximately 1550 degrees C temperature recorded on the outside of the tube in order for reaction and consolidation to occur. Nevertheless, it is likewise clear that the time for the tube walls to reach a uniform temperature, i.e., between 50 and 100 seconds, is much longer than the length of time, $T_t$, that the heat source resides at a given point during a normal traverse—usually 1 to 10 secs.

Appreciable heating of the tube wall occurs only during the torch residence time, $T_t = L_t/V$, where $L_t$ is the physical extent of the heat source, and v is its traverse velocity. To heat the inner wall, we consequently require that the thermal diffusivity time, $t_k$, be much less than the torch residence time $T_t$. From the expressions for the diffusivity time and the residence time, we conclude that the torch traverse velocity, v, must be less than $kL_t/2$. When the wall thickness is increased, for example 1 mm to 3 mm, the maximum traverse speed must be reduced almost an order of magnitude. Likewise, the reactant flow and consequently the deposition rate must be lowered to accomodate slower traverse speeds if deposits free of gas inclusions are to be obtained.

However, in this invention the starting wall thickness need not be determined by the ultimate core to cladding ratio. In this invention, the core deposition may be completed prior to completion of the cladding and consequently thin walled tubing may be used. One may, for example, according to the teachings of this invention, initiate an MCVD process with a large diameter (greater than 20 mm.) thin-walled (less than 2 mm.) tube. Large amounts of core material may be efficiently reacted, deposited and consolidated yielding a structure with a core-to-clad ratio greater than that desired in the ultimate fiber. Total wall thicknesses in this intermediate structure may be greater than 1.5 mm. and, if the traverse rate is slow, as great as 3 mm. Subsequent to internal deposition, the tube may be collapsed. Additional material is then deposited externally using, for example, the "soot" process. In this manner, the cladding thickness is increased to a sufficient degree so that the core to cladding ratio in the ultimate fiber is as required.

An alternative embodiment of this invention involves the fabrication of single mode fibers. As mentioned above, such fibers have relatively small diameter cores, and small core-to-clad ratios. The ultimate size of the core in the fiber is determined not only by the amount of material deposited during the preform fabrication, but also by the drawing ratio, namely, the ratio between the length of the fiber and the length of the preform from which it is drawn. The larger this ratio, the smaller the core size for a given amount of deposited material. The drawing ratio, however, is further constrained by the requirement that the overall fiber have a particular diameter. Thicker claddings would allow one to obtain higher drawing ratios and consequently, obtain smaller cores for given fiber diameters. As mentioned above, however, if the starting tube is used as cladding, the thickness of the tube wall and consequently the thickness of the preform is limited by the thermal transfer—hence, the drawing ratio is in a real sense limited by the thermal transfer problem. However, according to the teachings of this invention, a thin walled tube may be used and, subsequent to MCVD deposition, additional glass may be deposited externally to yield a relatively large diameter preform. Such a preform may be drawn into a fiber with a high drawing ratio, thereby obtaining smaller diameter cores more easily. Such single mode fibers will usually have cores of diameter less than 10 microns with overall diameters usually on the order of 100 microns.

It should be noted that in the practice of this invention, there is some interaction between the various parameters utilized during the deposition. As mentioned above, the maximum traverse rate is related to the thermal diffusivity of the wall. To some extent, the temperature of the heat source may be increased to compensate for inadequate thermal diffusivity. The tube diameter, while not fundamentally limited, is for practical concerns, limited by the nature of the thermophoretic temperature gradient which can establish and which accounts for a large part of the particulate diffusion from the center of the tube to the wall. The larger the tube diameter, the smaller the temperature gradient and the less effective the temperature gradient from the center of the wall to the tube in driving the particulates which are formed, to the tube wall.

For most practical embodiments, the diameter of the tube will usually be greater than 15 or 20 mm. In some embodiments, the diameter will be greater than 25 or 30 mm. Usually, the tube diameter will not exceed 40 mm. It is understood that the thicker the wall of the tube, the greater the heat transfer problem. As discussed above, the size of the wall thickness can be traded-off against the traverse rate, the flame temperature or other appropriate parameters. However, in most embodiments of this invention, the tube wall thickness will be less than 2 or 1.5 mm. Specialized tubes with wall thicknesses of less than 1.25 mm or 1.0 mm may also be used. It is understood that in the intermediate structure obtained, subsequent to internal deposition, the core-to-clad ratio is greater than that required in the ultimate fiber. In multi-mode radially graded fibers, the ultimate core-to-clad ratio is usually 0.5. Hence, for these fibers, the intermediate preform structure would have a core-to-clad ratio greater than 0.5 and in some instances, greater than 0.5 or 0.8 mm. In single mode fibers, the core-to-clad ratios are usually in the order of 0.05. Hence, for these fibers, the intermediate preform structure will have a core-to-clad ratio greater than 0.05 or 0.10. (Whereas generally the cladding referred to in discussing core-to-clad ratios is the optically active cladding, in the single mode configuration of this invention, the cladding referred to in the term "core-to-clad ratio" includes the optically inactive jacket).

EXAMPLE

In this example, the core was deposited in an etched Amersil TO8 fused silica tube (27 mm × 25 mm) using the MCVD process. The following deposition parameters were used after the tube was strain relieved and fire polished according to standard procedures.

| | |
|---|---|
| 2 Barrier Layers | 18 cc/min. $PCl_3$ |
| | 1.12 gms/min $SiCl_4$ |
| | 1850 cc/min $O_2$ |
| 91 Core Layers | 9 ccm $PCl_3$ |
| | 1.12 gms/min $O_2$ |
| 91 Core Layers | 9 ccm $PCl_3$ |
| | 1.12 gms/min $SiCl_4$ |
| | .09–.94 gms/min $GeCl_4$ |
| | (linearly increased with each pas |
| 1850–1400 cc/min $O_2$ | |
| | (linearly decreased with each pas to maintain total $O_2$ flow |
| at 2000 cc/min) | |
| Deposition Length | 41 cm |
| Deposition Traverse Rate | .225 cm/sec. |
| Deposition Temperature | 1650–1680 degrees C |

After deposition was completed, the tube was collapsed in three passes starting at the exit end:

| | |
|---|---|
| 1st pass with an $O_2$ back | .085 cm/sec. at 1960 degrees C. |
| | pressure = .05 in. water |
| 2nd pass with an $O_2$ back | .085 cm/sec. at 1960 degrees C. |
| | pressure = .08–.15 in. water |
| 3rd pass | .11 mm/sec. at 1955 degrees C., with no back pressure |

The collapsed preform was 30 cm long with an OD of 12.2±0.1 mm. Core/clad ratio was 0.73 with a core diameter of 9 mm.

The preform was then externally coated with a borosilicate deposit obtained from a flame hydrolysis burner. This burner injects a mixed stream of $SiCl_4$, $PCl_3$ vapor and oxygen through a methane-oxygen flame. The chlorides react to form particles which impinge and build up on the preform as it rotates and translates through the flame.

Silicon tetrachloride was delivered at a rate of 10 cm/min carried in a stream of oxygen of 200 cc/min; $PCl_3$ was added at a rate of 15 cc/min. Methane at 7 l/min was burned by adding oxygen at 6 l/min. The reactant stream was focused by a shield flow of $O_2$ at 3.0 l/min delivered by an annulus between the concentric reactant and burner ports of the torch. The overall torch pattern was confined by a flow of $O_2$ (2.5 l/min.) through an outer series of ports.

The burner was initially run for 105 min to build up a dense-coherent particulate layer over the surface of the preform. This layer was not measured but appeared to be about 3/16" thick. It was consolidated (vitrified) by a single pass of an oxy-hydrogen torch at a traverse rate of 8 cm/min. The temperature attained was approximately 1600 degrees C as measured by an optical pytometer. The diameter of the preform after this deposition was found to be 15 mm. A second coating (140 min.) was applied to bring the preform diameter to 18 mm, which more closely approached the desired diameter.

After the cladding process was completed, the preforms were drawn into fibers and loss measurements were made. Data are presented in Tables I and II and are compared to prior art 13 mm diameter preform.

TABLE I

| DIMENSIONS | | | |
|---|---|---|---|
| After Core Dep. | | After Clad Dep. | |
| OD(mm) | Core/Clad | OD(mm) | Core/Clad |
| 12.2 | .73 | 18.95 | .46 |

TABLE II

| LOSS | | | |
|---|---|---|---|
| Wavelength (nm) | 825 | Loss (db/km) 900 | 1000 | MA |
| Preform 1 | 4.83 | 3.26 | 2.45 | .220 |
| "Standard" 13 mm | 4.80 | 3.70 | 2.70 | .237 |

Launch MA = .18

I claim:

1. A process for fabrication of a glass fiber optical transmission line, comprising, a core section and a cladding, wherein the cladding has an index of refraction of a value lower than the maximum index of the core for energy of the wavelength to be transmitted, comprising introducing a moving stream of a vapor mixture including at least one compound glass-forming precursor together with an oxidizing medium into a tube while heating the tube so as to react the said mixture and produce a glassy deposit on the inner surface of the tube wherein heating of the tube and contents are, by a moving hot zone, produced by a correspondingly moving heat source external to the tube, wherein combustion within the tube is avoided, and wherein the temperature within the hot zone, composition of the vapor mixture, and rate of introduction of the vapor mixture are maintained at values such that at least a part of the reaction takes place within the gaseous mixture at a position spaced from the inner walls of the said tube thereby producing a suspension of oxidic reaction product particulate material whereby the particulate material while travelling downstream comes to rest on the inner surface of the tube within a region which extends from a position within the said hot zone, the moving zone serving the dual functions of nucleation site for homogeneous reaction to produce particulate matter and consolidation site for previously produced particulate matter, thereby yielding an intermediate preform structure;

the invention characterized in that the core-to-clad ratio of the intermediate preform structure is greater than that of the ultimate fiber, and in that additional glass material is formed subsequently on the outside of the intermediate preform structure to yield an optical fiber preform.

2. The method of claim 1 wherein the diameter of the starting tube is greater than 15 mm. 20 mm. or 30 mm.

3. The methods of claim 1 wherein the device used to deposit the glass material on the outside of the tube is a hydrolysis burner.

4. The methods of claim 1 wherein the tubular starting member is collapsed to a solid structure prior to external deposition.

5. The method of claim 1 further comprising drawing the optical fiber preform into a fiber.

6. The method of claim 1 wherein the fiber is a multimode fiber.

7. The method of claim 1 wherein the fiber is a single mode fiber.

8. The method of claim 1 wherein the wall thickness of the starting tube is less than 1.5 or 1.0 mm.

9. The method of claim 6 wherein the core-to-clad ratio of the intermediate preform structure is greater than 0.65 or 0.8.

10. The method of claim 7 wherein the core-to-clad ratio of the intermediate preform structure is greater than 0.05 or 0.10.

* * * * *